Sept. 2, 1941.  A. LAUKHUFF  2,254,374
CUTTING MACHINE
Filed July 20, 1939  3 Sheets-Sheet 3
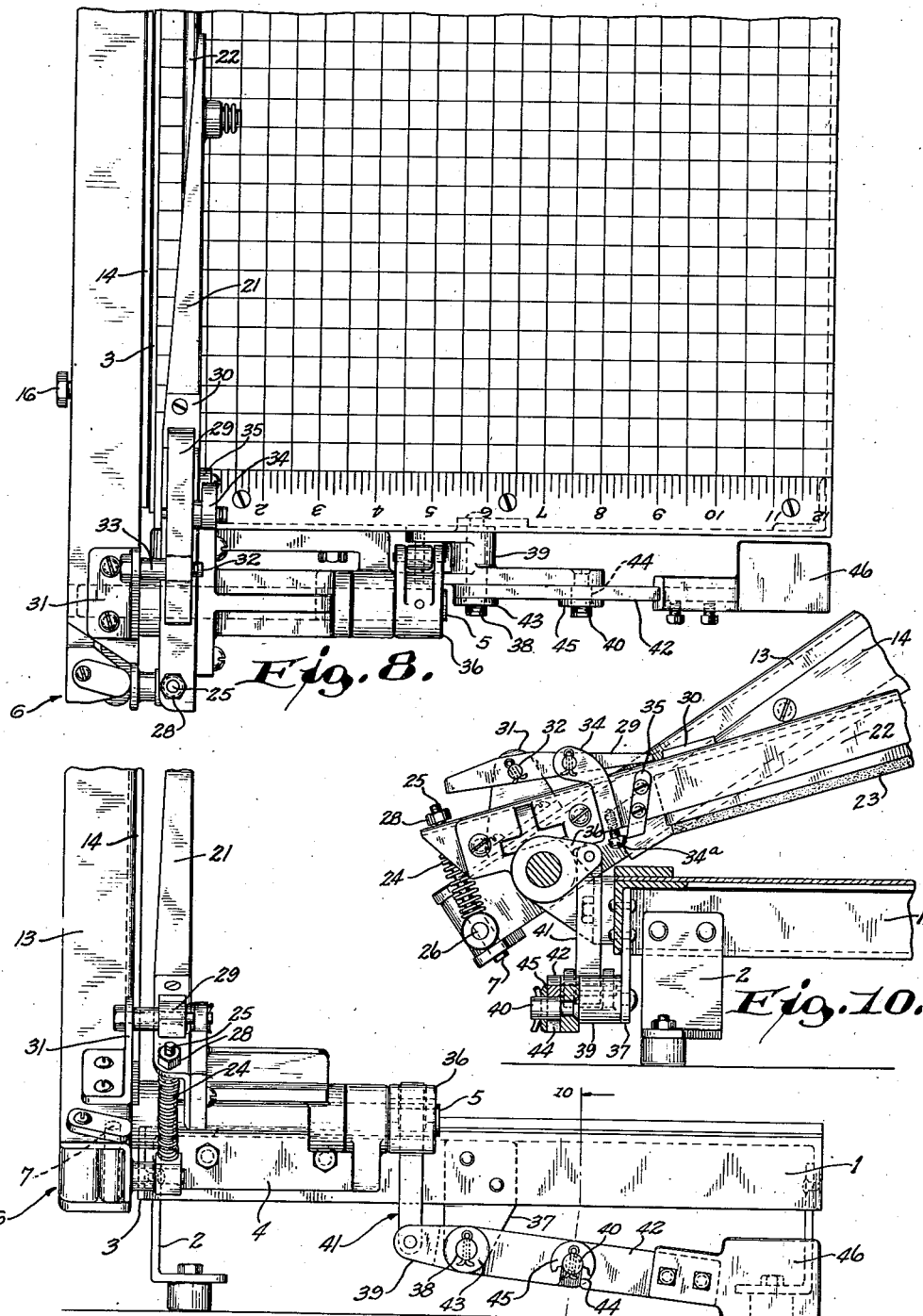

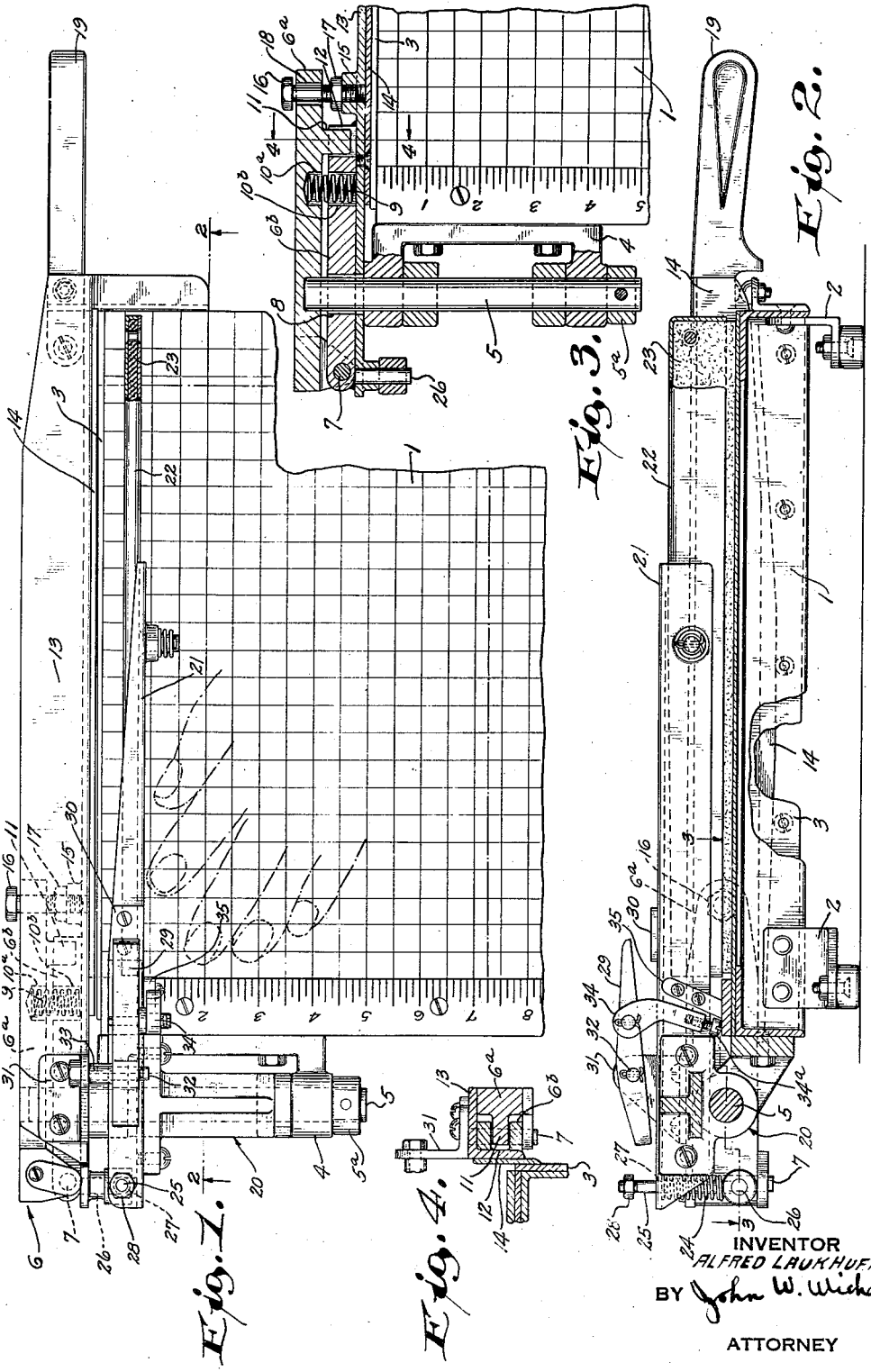

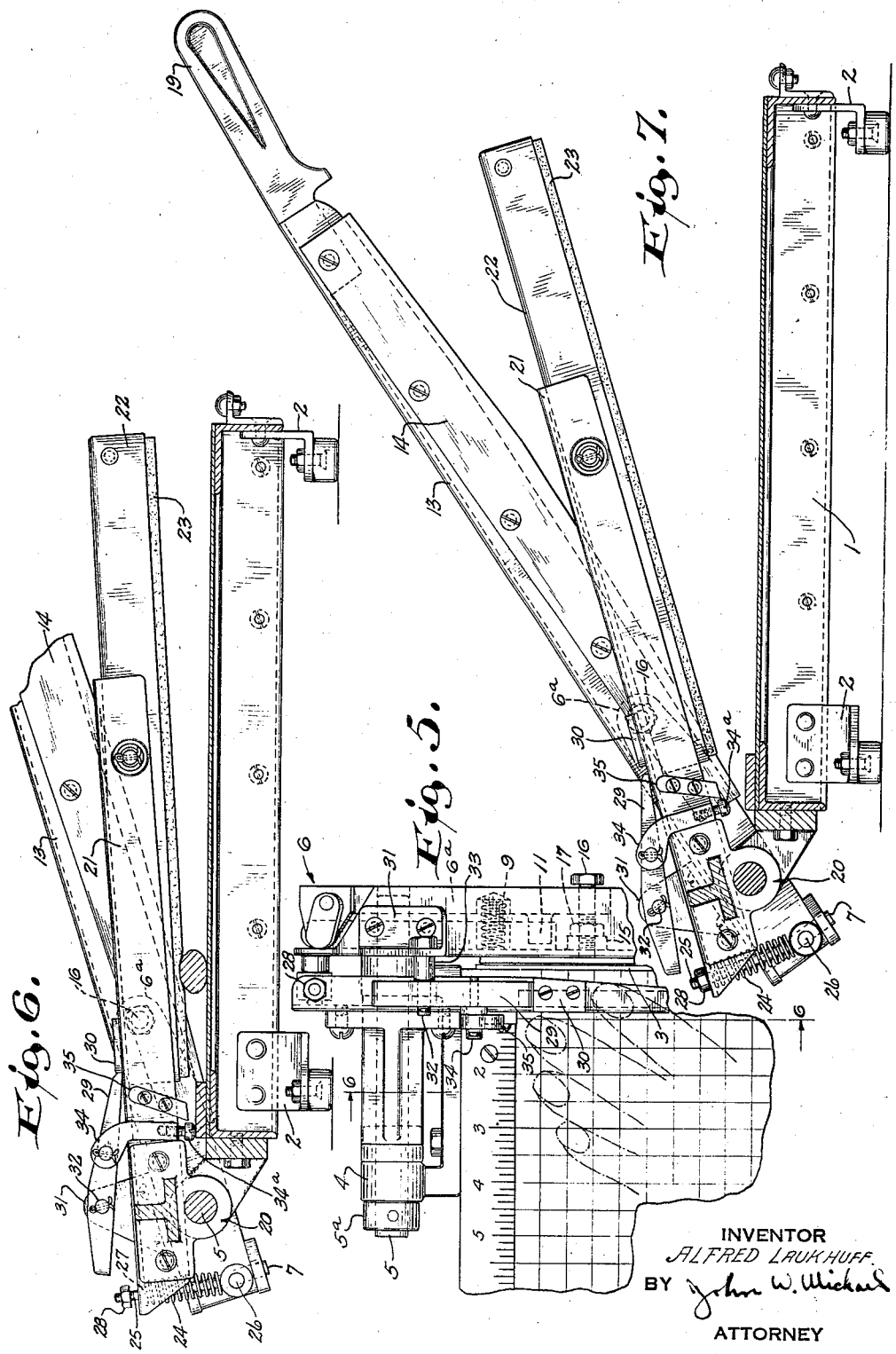

Patented Sept. 2, 1941

2,254,374

UNITED STATES PATENT OFFICE 2,254,374

CUTTING MACHINE

Alfred Laukhuff, Milwaukee, Wis.

Application July 20, 1939, Serial No. 285,466

12 Claims. (Cl. 164—45)

This invention relates to improvements in cutting machines, and is essentially designed and adapted for embodiment in a hand-operated type of cutter, although also capable of advantageous use in power cutters.

Some of the general features of the cutting machine embodying this invention are also present in the cutting machine disclosed in Patent No. 2,089,274, granted on August 7, 1937, on the application of Alfred Laukhuff, applicant herein. In the machine of that patent the cutting edge of the movable blade is inclined across the cutting edge of the stationary blade during the cutting action, and is spring biased toward the fixed blade to establish a normal, lateral engagement pressure between the blades. However, in that machine no additional lateral engagement pressure can be asserted by the operator.

One of the objects of this invention is to provide a cutting machine in which the cutting edges of the blades during the cutting action are inclined across each other, and spring biased to have normal lateral engagement pressure, and in which the operator can manually increase the lateral engagement pressure as vertical cutting pressure is applied.

Another object of the invention is to provide a cutting machine having a work-clamping bar, in which the movable blade is prevented from descending into cutting position when thick pieces, such as an operator's finger, are positioned under the clamping bar and in the path of the movable blade.

Another object is to provide a cutting machine having a counter-balanced movable blade, in which the plane of operation of the counter-balance is disposed at approximately right-angles to the plane of operation of the movable blade.

The foregoing objects are accomplished by providing a hinge member between the mounting shaft associated with the fixed blade and the movable blade. The movable blade is thus universally pivoted relative to the fixed blade. One arm (preferably the outer) of the supporting hinge is fixedly secured to the end of the mounting shaft. The movable blade is secured to the other arm (preferably the inner). A compression spring, positioned to react between the arms of the hinge, forces the inner arm and its associated movable blade toward the fixed blade. Thus, a normal lateral engagement is established between the blades of sufficient amount to cause the blades to sever material of a predetermined quality and thickness as the movable blade is swung through its cutting arc about the mounting shaft. In the event a thicker or less easily severable material than normal is inserted for cutting, the operator can supplement the force of the compression spring by manually urging the movable blade laterally toward the fixed blade during the cutting stroke.

In order to prevent the movable blade from commencing its cutting stroke when the operator's finger, or the like, is positioned in the cutting path, the movable blade is provided with a detent normally biased to have its end engage with a rigid block on the operating arm of the work-clamping bar. When the work-clamping bar is held in raised position from the surface of the cutting table, the engagement between the detent and the block prevents the movable cutter from swinging farther downwardly in its cutting stroke. When the work-clamping bar is lowered to normal position a dog attached to the detent operates to release its engagement with the rigid block and the movable cutter is permitted to advance.

The counter-balancing of the movable blade is accomplished by providing on the mounting shaft a crank arm which is linked to a lever pivoted to the back of the cutting table. This lever has a one way connection with the arm of a pivoted counter-weight. As the movable blade descends to the bottom of the cutting stroke, the counter-weight ascends. In raised position the counter-weight has potential ability to over-balance the movable blade (or balance it in static position according to predetermined desires), and move it by means of the lever, link, and crank arm to work-receiving position. The one way connection permits the movable blade to be moved to fully raised and swung back position.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1 is a plan view of a cutting machine embodying the invention, the movable blade and work-clamping bar being shown as positioned at completion of the cutting stroke;

Figure 2 is a view in transverse vertical section taken on the line 2—2 of Figure 1, parts being broken away and shown in elevation for the sake of clarity;

Figure 3 is an enlarged sectional view taken on the line 3—3 of Figure 2;

Figure 4 is a fragmentary sectional view taken on the line 4—4 of Figure 3;

Figure 5 is a fragmentary plan view of the cutting machine showing the movable blade and work-clamping bar raised to permit the operator's finger to be inserted beneath the clamping bar;

Figure 6 is a fragmentary view in transverse vertical section taken on the line 6—6 of Figure 5;

Figure 7 is a view in transverse vertical section similar to Figure 2, but showing the movable blade and work-clamping bar in raised position;

Figure 8 is a plan view of a cutting machine embodying the counter-balance for the movable blade;

Figure 9 is a view in rear side elevation of the cutting machine showing the counter-balance; and Figure 10 is a fragmentary sectional view taken on the line 10—10 of Figure 9.

The cutting machine embodying the present invention comprises a cutting table, designated generally at 1, supported on suitable feet 2. Fixed to one side of the table 1 is a stationary blade 3. A forked trunnion 4 is bolted to the back edge of the table 1 adjacent the fixed blade 3. A shaft 5 is rotatably supported in the trunnion 4 and prevented from axial movement in one direction by a collar 5a fixed to the shaft 5 and bearing against one fork of the trunnion 4.

Fixed to the outer end of the shaft 5 is a supporting hinge 6. The supporting hinge has two arms. The outer arm 6a is rigidly secured to the end of the shaft 5 by well-known means. The inner arm 6b of the hinge 6 is pivoted between inwardly projecting flanges on the end of the outer arm 6a by means of a removable pin 7. The inner arm 6b is also provided with an aperture 8 (see Figure 3) of sufficient size to loosely accommodate the shaft 5. A compression spring 9 is positioned between the inner and outer arms 6 and 6a, and is held in place by being positioned in recesses 10a and 10b provided in the respective arms. The outer arm 6a is provided with an inwardly projecting tongue 11 having a sliding fit in a slot 12 provided in the inner arm 6b, as is clearly illustrated in Figures 3 and 4 of the drawings.

An angle arm carrier 13 is fixed to the inner arm 6b, the vertical leg of the angle iron being provided with an aperture co-extensive with the aperture 8 in the inner arm 6b. To the vertical leg of the carrier 13 a movable cutting blade 14 is secured in a well-known manner. This leg of the carrier is also provided with a threaded protuberance 15 in which an adjusting bolt 16 is adjustably positioned through means of a lock nut 17. The adjusting bolt 16 loosely passes through an aperture 18 in the outer arm 6a of the hinge 6. An operating handle 19 is secured to the free end of the angle iron carrier 13.

The trunnion 4 is so positioned with respect to the fixed blade 3 that the pivot pin 7 is carried at a point spaced laterally from the fixed blade 3 an amount sufficient to require the movable blade 14 to be slightly inclined to the fixed blade 3 at the commencement of the cutting stroke. As the movable blade moves downwardly it is swung counter-clockwise, as viewed in Figures 1 and 3, about the pivot 7 by the camming action between the fixed blade and the moving blade.

The spring 9 tends to resist this counter-clockwise swinging and thus establishes a normal lateral engagement between the blades of predetermined pressure. The adjusting bolt 16 determines the initial angularity between the blades at the commencement of the cutting stroke. In the event material is inserted for cutting, which is more resistant to cutting than that for which the machine is normally set, the normal lateral engagement pressure established by the spring 9 can be supplemented by the operator by manually urging the handle 19 clockwise as it is urged downwardly.

A work clamp is provided which consists of a bracket 20 pivotally mounted on the shaft 5 between the forks of the trunnion 4. A carried arm 21 is secured to the bracket 20 with its free end extending over the surface of the table 1. To this free end there is pivoted in a well-known manner a work-clamping bar 22. The work-clamping bar 22 is provided with a strip of rubber 23 suitably secured to and projecting from the lower edge of the bar. The work clamping bar 22 is urged to work-clamping position in advance of the movable blade 14 by means of a compression spring 24 acting between the carrier arm 21 and the movable blade carrier 13. The spring 24 is held in place by being carried on a rod 25 pivotally mounted on the carrier 13 by a pivot pin 26. The rod 25 extends through an aperture 27 in the short end of the carrier 21, and is provided with a nut 28 which limits the degree of advance of the work-clamping bar 22 relative to the movable blade 14, as is clearly illustrated in Figure 7. The adjustment of the rod 25 is such that as the movable blade 14 advances to the commencement of its cutting engagement with the fixed blade 3, the work-clamping bar 22 will flatly engage the surface of the table 1. Thereafter further movement of the movable blade 14 merely increases tension in the compression spring 24.

To prevent the movable blade 14 from advancing into cutting position, if some obstruction, such as the operator's finger, is placed between the work-clamping bar 22 and the surface of the table 1, there is provided a detent 29 engageable with a ratchet block 30. On the horizontal leg of the angle iron carrier 13, approximately above the shaft 5, there is positioned an upwardly projecting bracket 31. The upper end of the bracket 31 is provided with a pin 32 extending laterally thereof and over the top of the carrier 21. The detent 29 is pivotally mounted on the pin 32, and is maintained in position immediately above the carrier 21 by a spacer 33 positioned on the pin 32 between the bracket 31 and the detent. A cotter pin, or other similar fastening device, holds the detent 29 on the pin 32. The detent 29 has a long end, which is so balanced as to be continually urged toward the carrier 21. The ratchet block 30 is secured by suitable means to the upper surface of the carrier 21. As is clearly shown in Figures 6 and 7, the long end of the detent 29 rides on the upper surface of the clamping bar 22 and is engageable with the block 30 to prevent further downward movement of the movable blade 14 if some obstruction placed in the path of the clamping bar 22 stops its downward movement (see Figure 6). In order to disengage the detent 29 from the block 30, to permit the movable blade 14 to complete its cutting stroke, a dog 34 is provided having an adjusting screw 34a at its lower end. The dog 34 is pivoted to the long end of the detent 29, and depends downwardly therefrom adjacent the side of the carrier 21. The end of the dog 34 is guided between an edge of the bracket 20 and a guide 35 on the carrier arm 21. In the event there is no abnormal obstruction between the clamping bar 22 and the surface of the table, the continued advancement of the clamping bar 22 and the movable blade 14 will be sufficient to cause an engagement between the lower end of the dog 34 and the upper surface of the table 1 to raise the long end of the detent 29 out of engagement with the block 30, thereby permitting the movable blade 14 to continue its advance and complete the cutting stroke. If there is an abnormal obstruction between the clamping bar 22 and the table, the dog 34 will not raise the detent 29, and it will engage the ratchet block 30 and prevent further downward movement of the blade 14.

It is desirable in hand-operated machines of this character to counter-balance the movable blade so that it remains in the position where last placed, or is urged to work-receiving position, as is shown in Figures 7 and 10. In counter-balancing the movable blade, it is desirable to arrange the counter-balance weight and lever so that it does not project to any great extent beyond the confines of the cutting table. To effectuate this, the collar 5a, heretofore described, is formed with an offset portion forming a forked crank arm, indicated at 36. A bracket 37 is secured in a depending manner from the edge of the table 1 adjacent the end of the shaft 5. The bracket 37 extends downwardly a suitable distance and carries a pin 38 positioned to provide a pivot for the counter-balancing weight. Positioned on the pivot 38 is a lever 39, one end of which is forked and extends below the forked crank arm 36, the other end of which is elongated and is provided with a stop pin 40 for the purpose hereinafter described. The forked crank arm 36 is connected by link 41 to the forked end of the lever 39; the ends of the link being provided with apertures adapted to rotatably receive pins held in the respective forks. Also pivoted to the pivot 38 is the weight arm 42. The weight arm 42 is positioned adjacent the elongated end of the lever 39 and is maintained in position on the pivot 38 by a suitable washer 43 and cotter pin. The arm 42 intermediate its ends is provided with a slot 44, which is adapted to loosely receive the stop 40 on the elongated end of lever 39. A washer 45, positioned on the stop 40, forms a guide for the arm 42 to aid in preventing it from having lateral movement away from the elongated arm of the lever 39 while permitting relative up and down movement therebetween. A counter-weight 46 is adjustably secured to the free end of the arm 42. The lengths of the crank arm 36, link 41, lever 39, arm 42, the height of the feet 2, and the relative positioning of the pivot 38 are such that when the weight 46 is resting on the same support as is the table 1, it will cause the weight arm 42, through the operation of the slot 44 and stop 40, to tilt the lever 39 about the pin 38 a sufficient amount to raise the link 41. The raising of link 41 causes the crank arm 36 to move in a counter-clockwise direction (as viewed in Figure 10) a sufficient amount to turn the shaft 5 and raise the movable blade 14 to the work-receiving position shown in Figure 10. If it is desirable to raise the movable blade 14 its full capacity, the one way connection existing between the slot 44 and the stop 40 will permit the lever 39 to move in a clockwise fashion (as viewed in Figure 9) a sufficient amount to allow for such movement of the blade 14 without in any respect changing the position of the weight 46 and the weight arm 42. As soon as the blade 14 is returned to the work-receiving position shown in Figure 10, the potential force of the weight 42 becomes effective. As the blade 14 is moved downwardly through its cutting stroke, the weight 46 is raised above the level of the plane upon which the table 1 is positioned. By increasing the size of counter-weight 46, and by adjusting its position longitudinally of the weight arm 42, the device may be adjusted so that the counter-weight 46 has sufficient potential force to maintain the blade 14 in raised position, as shown in Figure 10. By proper adjustment, the potential energy of the counter-weight 46 can be made to approximately offset the potential energy in the movable blade 14 so that the same will be left in stationary suspended position at any point during its cutting stroke which the operator desires. In place of the crank arm 36, link 41, and the forked end of the lever 39, there may be substituted the well-known transmission mechanism of bevel gears.

Although there are shown and described certain specific embodiments of the invention, many modifications thereof are possible. The invention is not to be restricted except in so far as is necessitated by the prior art, and by the spirit of the appended claims.

I claim:

1. A cutting machine comprising a fixed blade having a cutting edge, a shaft rotatably associated with said fixed blade, a hinge having one arm secured to said shaft, a movable blade secured to the other arm of said hinge, and a spring for urging said movable blade laterally toward said fixed blade.

2. A cutting machine comprising a fixed blade having a cutting edge, a shaft rotatably associated with said fixed blade and held from movement longitudinally of its axis, a hinge having one arm secured to said shaft, a movable blade secured to the other arm of said hinge, and a spring for urging said movable blade laterally toward said fixed blade.

3. A cutting machine comprising a table having a fixed blade, a movable blade having one end universally pivoted to said table, a handle on the other end of said movable blade, and a spring adapted to swing said movable blade laterally toward said fixed blade whereby said movable blade is caused to have cutting engagement with said fixed blade.

4. A cutting machine comprising a table having a fixed blade, a movable blade, a work clamp associated with and spring biased to move with and in advance of said movable blade, and detent and ratchet means to prevent said movable blade from advancing with respect to the work clamp when the movement of said work clamp is arrested at greater than a normal predetermined distance from said table.

5. A cutting machine comprising a table having a fixed blade, a movable blade, a work clamp associated with and spring biased to move with and in advance of said movable blade, detent and ratchet means to prevent said movable blade from advancing with respect to the work clamp when the movement of said work clamp is arrested at greater than a predetermined normal distance from said table, and adjustable means for determining said normal distance.

6. A cutting machine comprising a table having a fixed blade, a movable blade, a work clamp associated with and spring biased to move with and in advance of said movable blade, a detent carried by said movable blade, a block on said work clamp, said detent being biased to engage with said block, and a dog on said detent adapted to keep said detent out of engagement with said block when said clamp engages material of normal thickness placed on said table.

7. A cutting machine comprising a fixed blade having a cutting edge, a shaft rotatably associated with said fixed blade and held from movement longitudinally of its axis, a hinge having one arm secured to said shaft, a movable blade secured to the other arm of said hinge, tongue and slot means acting between said arms to aid in maintaining alinement therebetween, and a spring for urging said movable blade laterally toward said fixed blade.

8. A cutting machine comprising a table having a fixed blade, a shaft rotatably associated with said table and held from longitudinal movement of its axis, a hinge having two arms pivotally interconnected, tongue and slot means acting between said arms to aid in maintaining alinement therebetween, one arm of said hinge being secured to said shaft, a movable blade secured to the other arm of said hinge, and a spring for urging said movable blade laterally toward said fixed blade.

9. A cutting machine comprising a fixed blade, a movable blade cooperable with said fixed blade, a guard associated with and biased to move with and in advance of said movable blade, and a detent and rigid means to prevent said movable blade from advancing with respect to said guard when the movement of said guard is arrested at a greater than normal predetermined distance from said fixed blade.

10. A cutting machine comprising a fixed blade having a cutting edge along the top thereof, the plane of the side of said fixed blade passing through said cutting edge, a movable blade having a cutting edge along the bottom thereof, the plane of the side of said movable blade passing through the cutting edge thereof, and a supporting member pivoted for rotative movement about an axis perpendicular to said plane of said fixed blade, said movable blade being pivoted to said member for rotative movement laterally away from said fixed blade about an axis parallel to the said planes of both of said blades.

11. A cutting machine comprising a cutting table having supporting means adapting it for positioning on a flat surface, a pair of intersecting edges on said table, a fixed blade positioned along the first of said edges, a shaft carried by said table and having its axis substantially parallel with the second of said edges, a movable blade carried by said shaft and cooperable with said fixed blade, a pivot on said table extending substantially normal to said second of said edges, an arm mounted on said pivot and provided with a counterweight, said arm having its longitudinal axis substantially parallel to said second of said edges, and means interconnecting said shaft and said arm whereby said counterweight acts to balance said movable blade.

12. A cutting machine comprising a cutting table having supporting means adapting it for positioning on a flat surface, a pair of intersecting edges on said table, a fixed blade positioned along the first of said edges, a shaft carried by said table and having its axis substantially parallel with the second of said edges, a movable blade carried by said shaft and cooperable with said fixed blade, a pivot on said table extending substantially normal to said second of said edges, an arm mounted on said pivot and provided with a counterweight, said arm having its longitudinal axis substantially parallel to said second of said edges, a crank on said shaft, a lever also mounted on said pivot, a link connecting said crank and said lever, and a one-way connection between said lever and said arm.

ALFRED LAUKHUFF.